Figure 1:
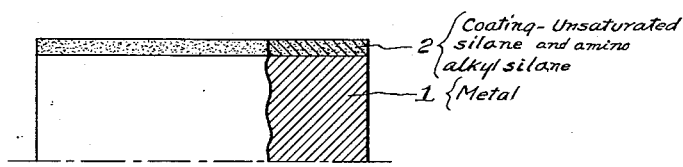

Feb. 20, 1962     D. M. JENKINS ETAL     3,022,196

COATING AND ADHESIVE COMPOSITION, METHOD AND PRODUCT

Filed Dec. 4, 1957

INVENTORS:
DAVID M. JENKINS
WILLIAM M. DeCREASE
BY Howson & Howson
ATTYS

United States Patent Office 3,022,196
Patented Feb. 20, 1962

3,022,196
COATING AND ADHESIVE COMPOSITION, METHOD AND PRODUCT
David M. Jenkins and William M. De Crease, Erie, Pa., assignors to Lord Manufacturing Company, Erie, Pa., a corporation of Pennsylvania
Filed Dec. 4, 1957, Ser. No. 700,587
28 Claims. (Cl. 117—127)

The present invention relates to a novel composition of matter possessing marked bonding affinity for metals and other solid substrates and for silicone rubber and therefore primarily adapted for use as a coating composition for metal and as an adhesive for bonding silicone rubber to metal and other solid substrates. The invention also relates to a novel method for coating metal with a protective coating, to a novel method for bonding silicone rubber to solid substrates, to novel coated metal products and to novel bonded assemblies comprising silicone rubber bonded to metal or other solid substrates through the agency of the present composition.

It is known that silicone rubbers can be bonded, under heat and pressure, to another solid surface, such as metal, by first priming the metal to which the silicone rubber is to be bonded with certain materials. Among the materials heretofore suggested as priming agents have been the silanes having the general formula $(RO)_3Si-R_1$ where R and $R_1$ are alkyl groups. Among the preferred silanes in this group suggested for use are tetraethylorthosilicates, t-butoxy-triethoxysilane, methyl triethoxysilane, and the like.

It is the principal object of the present invention to provide an improved adhesive composition for bonding silicone rubber to metal and other solid substrates which provides bond strengths which are superior to the previously suggested adhesive systems.

Another principal object of the present invention is to provide a novel composition capable of providing a protective film on metal surfaces.

Still another object of the present invention is to provide a novel method for bonding silicone rubber to metal and other solid substrates by which are provided bond strengths superior to those heretofore obtained.

A further object of the present invention is to provide a novel method for providing a protective coating on metal surfaces.

Other objects, including the provision of novel coated metal products and novel bonded silicone rubber assemblies, will become apparent from a consideration of the following specification and claims.

The novel composition of the present invention comprises a mixture of an unsaturated silane having the general formula $R_1-Si(OR)_3$ and an aminoalkyl silane having the general fromula $R_2-Si(R_3)_{3-n}(OR)_n$ where R is selected from the group consisting of alkyl groups containing from 1 to 10 carbon atoms and aryl groups; where $R_1$ is an unsaturated aliphatic chain; where $R_2$ is an aminoalkyl group containing from 3 to 10 carbon atoms; where $R_3$ is an alkyl group containing from 1 to 4 carbon atoms, and where $n$ is an integer selected from 2 and 3. The preferred form of the composition is as a free flowing solution of the stated components in a solvent therefor. In addition it has been found that the pH of the composition should not be substantially above the neutral range, as hereinafter described more in detail, for an all-purpose composition for bonding all silicone rubber stocks and for coating a wide range of metals.

In coating metal surfaces with the stated composition, the composition is simply applied to the metal surface and permitted to dry. In bonding silicone rubber to a substrate with the stated composition, the composition is interposed between the silicone rubber and the substrate surface to which the rubber is to be bonded, as by applying the composition to the substrate surface, and the resulting assembly is heated under pressure.

Figure 2:
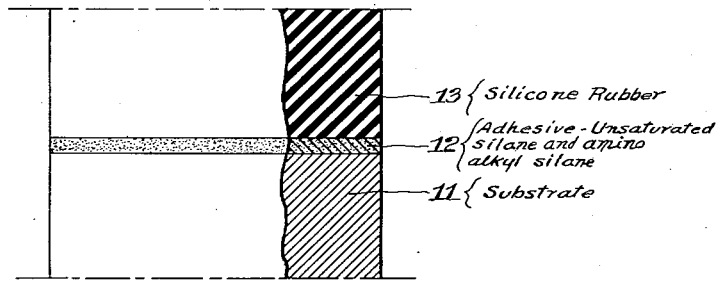

By way of further illustration of the present invention reference may be had to the drawings in which:

FIGURE 1 is a side elevational view, partly in section, illustrating a metal member coated with the present composition; and FIGURE 2 represents a side elevational view, partly in section, of a silicone rubber-metal assembly bonded by means of the present composition, it being understood that the substrate may be any solid material other than metal—as hereinafter discussed.

It has been found that through the use of the amino alkyl silane in conjunction with the unsaturated silane a coating composition for metals is provided which possesses unusually long life as a protective coating, much more so than use of either one of the components alone. The coating is not affected by boiling water even containing a detergent, resists abrasion and is highly resistant to heat. In addition, the combined materials provide an adhesive composition producing unusually good bonds between silicone rubber and metal and other solid substrates, the bond strengths being generally of a greater magnitude than those provided by saturated silanes of the type heretofore suggested or by either one of the components of the present composition alone. The bond formed during press cure molding is generally stronger than the silicone rubber itself as determined by attempts to separate the rubber and substrate resulting in tearing of the rubber. Moreover, bond strength is retained after subsequent curing, commonly referred to as "oven cure."

As is well known, the silicone rubbers are heat-curable, elastomeric organosilicon polymers, that is to say, organo-polysiloxanes, which, upon heating in combination with an appropriate curing agent, are converted to the solid, elastic state. Since the heat and pressure employed during the bonding operation of the present invention may be relied upon to convert the organopolysiloxane to the solid, elastic state, the organopolysiloxane actually employed in making the assembly, may be, and preferably is, in the uncured, that is to say, convertible, state. Both the cured and uncured forms will be referred to herein as silicone rubber. The silicone rubbers are well known to those familiar with the art, and the specific silicone rubber employed in accordance with the present invention is not critical and may be selected from any of the well known varieties. As is conventional, the silicone rubber employed may contain a curing agent, such as benzoyl peroxide, di-tert-butyl peroxide, and the like. Conventional filler materials may also be incorporated in the silicone rubber. When a cured silicone rubber body is employed in making up the assembly, it may be desirable to employ a "tie-cement" to facilitate adhesion and such a tie-cement is usually prepared from uncured silicone rubber.

It has been found that, in accordance with the present invention, silicone rubber may be bonded to a wide variety of solid bodies of the type used in making structural fabrications including metal, ceramic, glass (including glass fabric), wood, resins, resin-bonded bodies, rubber, including another silicone rubber body, hydraulic cement, textiles containing synthetic organic fibers, and the like. In most instances, the surfaces to which the silicone rubber is bonded, will be a metal, especially steel, aluminum, aluminum alloys, copper, copper alloys, including brass, magnesium, magnesium alloys, stainless steel, and the like; or textiles, such as those made from synthetic fibers like the condensation product of dimethyl terephthalate and ethylene glycol (Dacron), polyamide (nylon type), and the like. The substrate will be solid (as distinguished from liquid) not only at room temperature but also at the temperatures employed during the bonding operation as discussed more in detail hereinafter. As a coating composition for metal, the present composition may be applied to any of metal surfaces such as those illustrated above.

The metal surface, either when simply to be provided with a protective coating or bonded to silicone rubber, is preferably clean and free from loose oxide scale. This may be accomplished by a wide variety of ways well known to those skilled in the art. For example, the surface may be first degreased as by dipping the article in a degreasing solution or by subjecting the article to vaporized degreasing material such as trichloroethylene. Following this degreasing operation, the metal article may be further cleaned as by blasting the surface with conventional material such as steel shot, grit, sand, or the like. Copper, or copper alloy articles, can simply be cleaned to remove the tarnish thereon by chemical means.

As stated, the composition of the present invention comprises a mixture of an unsaturated silane and an aminoalkyl silane as defined above. Referring specifically to the unsaturated silane it will have, as stated, the general formula $R_1$—$Si(OR)_3$. $R_1$ is an unsaturated hydrocarbon chain (including halogen-substituted unsaturated hydrocarbon chains). The unsaturated chain may be open or closed, that is to say, it may be an unsaturated open aliphatic chain or an unsaturated cycloaliphatic chain. At least one double bond will be present in the chain, and the chain will generally contain from about 2 to about 10 carbon atoms. Examples of such unsaturated hydrocarbon chains and halogen-substituted derivatives thereof are vinyl, chlorovinyl, cyclohexenyl, bicycloheptenyl, butenyl, chlorobutenyl, cyclopentadienyl, chlorocyclohexenyl, dichlorocyclohexenyl, dichlorobutenyl, allyl, chloroallyl, decenyl, the radical produced by reacting dicyclopentadiene with vinyl trialkoxysilanes, and the like. In the preferred compounds $R_1$ will be a vinyl group. In the foregoing formula R will be an alkyl group, generally containing from 1 to 10 carbon atoms, such as methyl, ethyl, propyl, butyl, octyl, decyl, and the like, or an aryl group, especially a phenyl group. In the preferred compounds, R is a lower alkyl group, most usually ethyl. In this connection, vinyl triethoxysilane has been found to be particularly advantageous.

Referring to the amino alkyl silane component of the present composition, this material will have the general formula $R_2$—$Si(R_3)_{3-n}(OR)_n$. In this formula R will be as defined above in connection with the unsaturated silane. $R_2$ will be an aminoalkyl group generally containing from 3 to 10 carbon atoms. Examples of such groups are aminoethyl, aminopropyl, aminobutyl, aminooctyl, aminodecyl, and the like. The compound may contain either two or three OR groups, and when the compound contains three OR groups there will be no $R_3$ group. However, when the compound contains two OR groups there will be an $R_3$ group, and $R_3$ may be a lower alkyl group, generally containing from 1 to 4 carbon atoms, such as methyl, ethyl, propyl, butyl, and the like. Of the aminoalkyl silanes, those containing three OR groups are preferred. In connection with the foregoing gamma aminopropyl triethoxy silane has been found to be particularly advantageous.

The relative proportion of unsaturated silane to aminoalkyl silane present in the present composition may vary somewhat from about nine parts by weight of aminoalkyl silane to about one part of unsaturated silane down to about one part of the former per nine parts, by weight, of the latter. The particular proportions selected may depend somewhat upon the use intended. For example, in the bonding of silicone rubebr to a substrate, it has been found that compositions in which the proportion of aminoalkyl silane to unsaturated silane is between about 1:1 and about 9:1 give the best results. An especially advantageous combination in this connection is one in which there are about two parts, by weight, of aminoalkyl silane per part of unsaturated silane. As a coating composition, on the other hand, it has been found that compositions in which the proportion of aminoalkyl silane to unsaturated silane is between about 1:1 and about 1:9 give optimum results. In this connection a proportion of about 5 parts of unsaturated silane per part of aminoalkyl silane is especially advantageous.

For application either as a coating composition or as an adhesive, the present composition will generally be in the form of a solution of the stated components. Generally speaking, any solvent for the components which is also miscible with water may be used, such as alcohols, glycols, ketones, glycol ethers, and the like, may be used. Of the solvent systems for the adhesive compositions, aqueous alcohol, either methyl alcohol, ethyl alcohol or isopropyl alcohol, in which the alcohol predominates, is especially advantageous. In the coating compositions it is preferred that a water-free solvent, such as isopropyl alcohol, be employed. The concentration of solids, based on the weight of the stated principal components, may vary somewhat depending largely upon the method of application selected, and the solids concentration in the solution may be as low as about 1%, particularly when the solution is applied by spraying. The solids concentration may range well above this figure, even up to about 75%, by weight. Preferably, the concentration, for application by dipping, is between about 8 and about 14%.

The pH of a solution of the stated components may be 9 or greater. While such a solution may be well adapted to provide excellent coatings on certain metals, or to provide good bonds between certain silicone rubber stocks and certain substrates, it is preferred for compositions to be used in connection with all substrates, that the pH be adjusted to below 8.5. In this case, as is apparent from the specific examples, the pH may range down to about 1. Here again, although compositions having a pH in the lower end of the range may provide excellent coatings on and bonds with certain substrates, it is preferred, as a general purpose composition for use with substrates, generally, that the pH be adjusted to within the range of about 7 to about 8.5. Certain of the principal components may be sufficiently acid to provide the desired acidity. For example, α-chlorovinyl triethoxysilane is sufficiently acid to provide an acid pH.

The adjustment of the pH, generally speaking, can be accomplished through the use of any acid or acidic material that is compatible with the system so that the components remain in solution. That is to say, the acid material employed should not itself be insoluble in the solution or form, with one or more of the other principal components, a product insoluble in the solution. No difficulty will be encountered in selecting a pH having acid material meeting the foregoing requirement. Hydrochloric acid has been found to be especially advantageous regardless of the substrate employed, and nitric acid has been found to produce excellent results with aluminum. Another acidic material, beta carbethoxyethyltriethoxysilane, has been found to give excellent results with aluminum and steel, and beta carbethoxypropylmethyldiethoxysilane has been found to give excellent results with aluminum and good results with steel.

In applying the present composition as a protective coating on metal, the composition may simply be applied to the metal surface as by spraying, dipping, brushing, wiping, and the like, after which the composition is permitted to dry. This provides the structure illustrated in FIGURE 1 where 1 is the metal substrate and 2 is the coating. In the case of bonding silicone rubber to a substrate, generally speaking a substantially dry film of the composition is interposed between the silicone rubber and the substrate surface, the silicone rubber and substrate brought together and heated under pressure. This provides the structure illustrated in FIGURE 2 where 11 is the substrate, 13 is the silicone rubber and 12 is the adhesive. Thus, in employing the composition as an adhesive, the composition may be applied either to the silicone rubber surface or to the substrate surface, preferably the latter, following which the composition is permitted to dry substantially.

With respect to the bonding of silicone rubber to substrates, the temperatures employed during the bonding operation may vary somewhat depending upon the nature of the silicone rubber. However, in general, temperatures ranging between about 230 and about 350° F. will be employed. Sufficient time will be allowed to provide the desired cure of the bond and of the silicone rubber when uncured silicone rubber is employed, and the time may range from about 10 to about 40 minutes. The pressure employed may also vary and may be as low as that merely required to provide intimate contact, that is, a few pounds per square inch. The upper limit of pressure is not critical and pressures as high as a few thousand pounds per square inch may be employed. The bond provided by this hot pressing operation may be further improved by additional curing at higher temperatures for longer periods of time. For example, following this pressing operation, the assembly may be heated to from about 300 to about 500° F. for several hours as by placing it in an oven through which hot air is circulated.

In the case of simple coating of metal surfaces with the present composition it has been found that complete cure of the coating can be obtained at room temperature after several, e.g. 20 hours. Elevated temperatures hasten the cure. For example, complete cure can also be obtained on heating to 220° F. for 10 minutes.

The present invention will be more clearly understood from a consideration of the following specific examples which are given for the purpose of illustration only and are not intended to limit the scope of the invention in any way.

Examples I–XV

In the following Examples I–XV, a silicon rubber stock (U.C.C.K1045 silicone rubber catalyzed with di-tert. butyl peroxide) was bonded to various metals including aluminum, copper, and steel. In the case of the aluminum, the aluminum article was preliminarily treated with a solution of 2,4-dinitrobenzene sulfonic acid, and the copper and steel were first degreased, then grit blasted and finally degreased again. In all cases, two assemblies of each combination were prepared and tested, and the data is the average of the two. The assemblies were press-cured at 340° F. for 30 minutes, the resulting samples were permitted to stand at room temperature for 18–24 hours and then pulled to failure on a Scott tester using the 45° angle peel test. The adhesive compositions after preparation were permitted to stand overnight before use, and the formulations were applied to the metal pieces by dipping. All the formulations were made up to 12% solids.

Example I

A solution is prepared from 8 parts, by weight, of gamma aminopropyltriethoxysilane, 4 parts of vinyltriethoxysilane, 78 parts of methanol and 9 parts of water. The pH is adjusted to 1 with concentrated hydrochloric acid. The silicone rubber stock is bonded to aluminum, copper and steel, respectively, with the following results:

Aluminum-bond strength 27 pounds per inch with all of the failure in the rubber body; copper-bond strength 24 pounds per inch with 90% of the failure in the rubber body; steel-bond strength 27 pounds per inch with 90% of the failure in the rubber body.

Example II

A composition is prepared as in Example I with, however, the pH being adjusted to 2 with concentrated hydrochloric acid. The silicone rubber stock was bonded to aluminum, copper and steel, respectively, with the following results:

Aluminum-bond strength 25 pounds per inch with all of the failure in the rubber body; copper-bond strength 25 pounds per inch with 90% of the failure in the rubber body; steel-bond strength 25 pounds per inch with 90% of the failure in the rubber body.

Example III

A composition is prepared as in Example I, with, however, the pH being adjusted to 3 with concentrated hydrochloric acid. The silicone rubber stock was bonded to aluminum, copper and steel, respectively, with the following results:

Aluminum-bond strength 23 pounds per inch with all of the failure in the rubber body; copper-bond strength 23 pounds per inch with 80% of the failure in the rubber body; steel-bond strength 25 pounds per inch with 70% of the failure in the rubber body.

This example was repeated with the same adhesive composition after it had stood for three weeks, and all of the bonds produced were excellent with all of the failure in the rubber body.

Example IV

A composition is prepared as in Example I, with, however, the pH being adjusted to 4 with concentrated hydrochloric acid. The silicone rubber stock was bonded to aluminum, copper and steel, respectively, with the following results:

Aluminum-bond strength 23 pounds per inch with all of the failure in the rubber body; copper-bond strength 24 pounds per inch with 50% of the failure in the rubber body; steel-bond strength 23 pounds per inch with 90% of the falure in the rubber body.

This example was repeated with the same adhesive composition after it had stood for three weeks, and all of the bonds produced were excellent, with the failure being entirely within the rubber body.

Example V

A composition is prepared as in Example I, with, however, the pH being adjusted to 5 with concentrated hydrochloric acid. The silicone rubber stock was bonded to aluminum, copper and steel, respectively, with the following results:

Aluminum-bond strength 28 pounds per inch with complete stock failure in the rubber body; copper-bond strength 27 pounds per inch with complete stock breakage in the rubber body; steel-bond strength 28 pounds per inch with complete stock breakage in the rubber body.

This example was repeated with the same adhesive composition after it had stored for three weeks with the same excellent results.

Example VI

The composition is prepared as in Example I, with, however, adjustment of the pH to 6 with concentrated hydrochloric acid. The silicone rubber stock was bonded to aluminum, copper and steel, respectively, with the following results:

Aluminum-bond strength 30 pounds per inch with complete stock breakage in the rubber body; copper-bond strength 32 pounds per inch with complete stock breakage in the rubber body; steel-bond strength 29 pounds per inch with complete stock breakage in the rubber body.

This example was repeated after the adhesive composition had stood for three weeks with the same excellent results.

Example VII

A composition is prepared as in Example I, with, however, adjustment of the pH to 7 with concentrated hydrochloric acid. A silicone rubber stock was bonded to aluminum, copper and steel, respectively, with the following results:

Aluminum-bond strength 29 pounds per inch with complete stock breakage in the rubber body; copper-bond strength 24 pounds per inch with 50% stock failure in the rubber body; steel-bond strength 26 pounds per inch with 80% failure in the rubber body.

*Example VIII*

A composition is prepared as in Example I, with, however, adjustment of the pH to 8 with concentrated hydrochloric acid. The silicone rubber stock was bonded to aluminum, copper and steel, respectively, with the following results:

Aluminum-bond strength 30 pounds per inch with all of the failure in the rubber body; copper-bond strength 30 pounds per inch with complete stock breakage in the rubber body; steel-bond strength 28 pounds per inch with complete stock breakage in the rubber body.

*Example IX*

A solution is prepared from 8 parts of gamma aminopropyltriethoxysilane, 4 parts of vinyl triethoxysilane, 78 parts of methanol, 9.25 parts of water and 0.75 part of concentrated hydrochloric acid to give a pH of 8.2. The silicone rubber stock was bonded to aluminum, copper and steel, respectively, with the following results:

Aluminum-bond strength 28 pounds per inch with complete stock breakage in rubber body; copper-bond strength 28 pounds per inch with complete stock breakage in the rubber body; steel-bond strength 30 pounds per inch with complete stock breakage in the rubber body.

*Example X*

A solution is prepared from 8 parts of gamma aminopropyltriethoxysilane, 4 parts of vinyl triethoxysilane, 78 parts of methanol and 10 parts of water. The solution has a pH of 9. The silicone rubber stock was bonded to aluminum, copper and steel, respectively, with the following results:

Aluminum-bond strength 30 pounds per inch with 90% of the failure in the rubber body; copper-bond strength 28 pounds per inch with 50% of the failure in the rubber body; steel-bond strength 29 pounds per inch with 50% of the failure in the rubber body.

*Example XI*

A solution is prepared as in Example I, with, however, 0.67 part of concentrated nitric acid in place of hydrochloric acid to provide a pH of 8.5. The silicone rubber stock was bonded to aluminum, copper and steel, respectively, with the following results:

Aluminum-bond strength 37 pounds per inch with complete stock breakage in the rubber body; copper-bond strength 22 pounds per inch with all failure within the rubber body; steel-bond strength 19 pounds per inch with 50% of the failure in the rubber body.

*Example XII*

A solution is prepared from 8 parts of delta aminobutylmethyldiethoxysilane, 4 parts of vinyl triethoxysilane, 78 parts of methanol and 10 parts of 7.5% hydrochloric acid. The silicone rubber stock was bonded to aluminum, copper and steel, respectively, with the following results:

Aluminum-bond strength 28 pounds per inch with 50% of the bond failure in the rubber body; copper-bond strength 27 pounds per inch with 50% of the failure in the rubber body; steel-bond strength 26 pounds per inch with 70% of the failure in the rubber body.

*Example XIII*

A solution is prepared from 4 parts of vinyl triethoxysilane, 4 parts of gamma aminopropyltriethoxysilane, 4 parts of beta carbethoxypropylmethyldiethoxysilane and 78 parts of methanol. The solution has a pH of 8. The silicone rubber stock was bonded to aluminum and steel with the following results:

Aluminum-bond strength 31 pounds per inch with 95% of the failure in the rubber body; steel-bond strength 30 pounds per inch with 95% of the failure in the rubber body.

*Example XIV*

A solution is prepared from 4 parts of vinyl triethoxysilane, 4 parts of gamma aminopropyltriethoxysilane, 4 parts of beta carbethoxyethyltriethoxysilane and 78 parts of methanol. The solution has a pH of 8. The silicone rubber stock was bonded to aluminum and steel with the following results:

Aluminum-bond strength 29 pounds per inch with 95% of the failure in the rubber body; steel-bond strength 22 pounds per inch with 75% of the failure in the rubber body.

*Example XV*

In this example a glass panel is dipped in the adhesive composition of Example IX, and then air-dried for ten (10) minutes. The glass panel is then bonded to the silicone rubber stock of Example I in a press under sufficient pressure to provide intimate contact at 340° F. for thirty (30) minutes. After removal from the press, the assembly is permitted to stand at room temperature for 18–24 hours.

The glass panel can not be removed from the rubber without breaking the glass.

*Example XVI*

In this example a silicone rubber stock of the same type as employed in Example I is bonded to a desized fabric made of fibers of the condensation product of dimethyl terephthalate and ethylene glycol, using the adhesive of Example IX. The fabric is dipped in the adhesive to provide a weight pick-up of 0.5–1%, after drying. The coated fabric is initially heated at 240–260° F. for 15 minutes, and then sandwiched between two slabs of the silicone rubber stock. The sandwich is press cured as in Example I, and then permitted to stand for 18–24 hours. Twelve small sandwiches, 1 inch by 5 inches (an inch of which is marked so as not to bond), are cut from the large sandwich and tested individually in a Scott tester using a 90° angle pull test. The average pull is 35 pounds per inch, with 100% failure in the rubber body.

*Example XVII*

In this example a solution is prepared from 40 parts, by weight, of vinyltriethoxysilane, 8 parts of gamma aminopropyltriethoxysilane, 1.2 parts of concentrated hydrochloric acid and 50.8 parts of isopropyl alcohol. The solution has a pH of 8.

The solution is applied to portions of copper strips by dipping copper strips to half their length therein. Some of the strips are dried for 20 hours at room temperature, and some are dried at 250° F. for 30 minutes.

The strips are then exposed to a hydrogen sulfide atmosphere until the uncoated portion is badly stained. The coated portion in all cases is clear and colorless showing continuity, impermeability and cure of film. The coating also resists abrading with hard surfaces.

*Example XVIII*

The composition of Example IX is applied, by dipping, spraying and brushing, to samples of carbon steel, stainless steel, copper, brass, chromium-plated steel, silver and aluminum, and the coating cured.

In all cases excellent protective coatings are provided. Under flexing tests, where coated metal strips are bent (with the coated side up) about mandrels varying from 1/8" to 1" in diameter, no cracks, splits or other defect in the film is noted and no failure in adhesion is found. Samples heated to temperature as high as 400° F. show no significant deterioration in the film or bond. The aluminum coated samples, when subjected to a salt water spray for 48 hours, show no visible effect on the film.

The coatings are resistant to hexane, toluene, methanol, acetone, chloroform, xylene, ethyl acetate and Cellosolve.

The coatings are also tested on a General Electric flexibility tester involving dropping knobbed metal cylindrical weights. The films withstand 60% elongation with no breaks, splits or other damage to the film.

The coated samples on being exposed to sun, wind and rain for a month show no visible signs of deterioration.

*Example XIX*

In this example a solution is prepared from 4 parts, by weight, of α-chlorovinyltriethoxysilane, 8 parts of gamma aminopropyltriethoxysilane, 10 parts of water and 78 parts of methanol. The solution has a pH of about 1.

Following the procedure of Examples I–XV, silicone rubber is bonded to aluminum and copper with the following results.

Aluminum-bond strength 28 pounds per inch with complete stock breakage in the rubber body; copper-bond strength 27 pounds per inch with 90% of the failure in the rubber body.

Modification is possible in the selection of substrates bonded to silicone rubber and of metals coated in accordance with the present invention as well as in the selection of particular unsaturated silanes and aminoalkyl silanes without departing from the scope of the present invention.

We claim:

1. A coating composition comprising a solution, in aqueous alcohol, of a mixture of vinyl triethoxysilane and gamma aminopropyl triethoxysilane in a proportion of about five parts, by weight, of the former per part of the latter.

2. The method of providing a protective coating on metal surfaces which comprises applying to a metal surface a composition prepared by dissolving an unsaturated silane having the general formula $R_1$—$Si(OR)_3$ and an aminoalkyl silane having the general formula $R_2$—$Si(R_3)_{3-n}(OR)_n$, where R is selected from the group consisting of alkyl groups and aryl groups containing from 1 to 10, inclusive, carbon atoms; where $R_1$ is an unsaturated aliphatic chain; where $R_2$ is an aminoalkyl group containing from 3 to 10, inclusive, carbon atoms; where $R_3$ is an alkyl group containing from 1 to 4, inclusive, carbon atoms, and where $n$ is an integer selected from 2 and 3, in a proportion of said aminoalkyl silane to said unsaturated silane of between about 1:1 to about 1:9, both inclusive, in aqueous alcohol, and letting said composition dry on said surface.

3. A composition of matter consisting essentially of a mixture of between about one and about nine parts, inclusive, by weight, of an unsaturated silane having the general formula $R_1$—$Si(OR)_3$ and between about one and about nine parts, inclusive, by weight, of an aminoalkyl silane having the general formula $$R_2—Si(R_3)_{3-n}(OR)_n$$

where R is selected from the group consisting of alkyl groups and aryl groups containing from 1 to 10, inclusive, carbon atoms; where $R_1$ is an unsaturated aliphatic chain; where $R_2$ is an aminoalkyl group containing from 3 to 10, inclusive, carbon atoms, where $R_3$ is an alkyl group containing from 1 to 4, inclusive, carbon atoms, and where $n$ is an integer selected from 2 and 3.

4. A composition of matter comprising a substantially water-free solution of a mixture of between about one and about nine parts, inclusive, by weight, of an unsaturated silane having the general formula $R_2$—$Si(OR)_n$ and between about one and about nine parts, inclusive, by weight, of an aminoalkyl silane having the general formula $R_2$—$Si(R_3)_{3-n}(OR)_n$ where R is selected from the group consisting of alkyl groups and aryl groups containing from 1 to 10, inclusive, carbon atoms; where $R_1$ is an unsaturated aliphatic chain; where $R_2$ is an aminoalkyl group containing from 3 to 10, inclusive, carbon atoms; where $R_3$ is an alkyl group containing from 1 to 4, inclusive, carbon atoms, and where $n$ is an integer selected from 2 and 3.

5. A composition of matter comprising a solution, in alcohol, of a mixture of between about one and about nine parts, inclusive, by weight, of an unsaturated silane having the general formula $R_1$—$Si(OR)_3$ and between about one and about nine parts, inclusive, by weight, of an aminoalkyl silane having the general formula $$R_2—Si(R_3)_{3-n}(OR)_n$$

where R is selected from the group consisting of alkyl groups and aryl groups containing from 1 to 10, inclusive, carbon atoms; where $R_1$ is an unsaturated aliphatic chain; where $R_2$ is an aminoalkyl group containing from 3 to 10, inclusive, carbon atoms; where $R_3$ is an alkyl group containing from 1 to 4, inclusive, carbon atoms, and where $n$ is an integer selected from 2 and 3.

6. The product of claim 5 having a pH not substantially in excess of 9.

7. The product of claim 5 having a pH between about 7 and about 8.5.

8. The product of claim 5 containing also hydrochloric acid.

9. A composition of matter comprising a solution, in aqueous alcohol, of a mixture of between about one and about nine parts, inclusive, by weight, of an unsaturated silane having the general formula $R_1$—$Si(OR)_3$ and between about one and about nine parts, inclusive, by weight, of an aminoalkyl silane having the general formula $R_2$—$Si(R_3)_{3-n}(OR)_n$ where R is selected from the group consisting of alkyl groups and aryl groups containing from 1 to 10, inclusive, carbon atoms; where $R_1$ is an unsaturated aliphatic chain; where $R_2$ is an aminoalkyl group containing from 3 to 10, inclusive, carbon atoms; where $R_3$ is an alkyl group containing from 1 to 4, inclusive, carbon atoms, and where $n$ is an integer selected from 2 and 3.

10. The product of claim 9 having a pH not substantially in excess of 9.

11. The product of claim 9 having a pH between about 7 and about 8.5.

12. The product of claim 9 containing also hydrochloric acid.

13. The product of claim 9 wherein $n$ is 3.

14. The product of claim 9 wherein the proportions of aminoalkyl silane to unsaturated silane is between about one and about nine parts, inclusive, by weight, of the former per part of the latter.

15. A composition of matter consisting essentially of a mixture of between about one and about nine parts, inclusive, by weight, of vinyl triethoxysilane and between about one and about nine parts, inclusive, by weight, of gamma aminopropyl triethoxysilane.

16. A composition of matter comprising a substantially water-free solution of a mixture of between about one and about nine parts, inclusive, by weight, of vinyl triethoxysilane and between about one and about nine parts, inclusive, by weight, of gamma aminopropyl triethoxysilane.

17. A composition of matter comprising a solution, in alcohol, of a mixture of between about one and about nine parts, inclusive, by weight, of vinyl triethoxysilane and between about one and about nine parts, inclusive, by weight, of gamma aminopropyl triethoxysilane.

18. The product of claim 17 having a pH not substantially in excess of 9.

19. The product of claim 17 having a pH of between about 7 and about 8.5.

20. The product of claim 17 containing also hydrochloric acid.

21. A composition of matter comprising a solution, in aqueous alcohol, of a mixture of between about one and about nine parts, inclusive, by weight, of vinyl triethoxysilane and between about one and about nine parts, inclusive, by weight, of gamma aminopropyl triethoxysilane.

22. The product of claim 21 having a pH not substantially in excess of 9.

23. The product of claim 21 having a pH of between about 7 and about 8.5.

24. The product of claim 21 containing also hydrochloric acid.

25. The product of claim 21 wherein the proportion of aminoalkyl silane to unsaturated silane is between about one and about nine parts, inclusive, by weight, of the former per part of the latter.

26. A composition of matter comprising a solution, in aqueous alcohol, of a mixture of gamma aminopropyl triethoxysilane and vinyl triethoxysilane in a proportion of about two parts, by weight, of the former per part of the latter.

27. The product of claim 26 having a pH between about 7 and about 8.5.

28. The product of claim 26 containing also hydrochloric acid.

References Cited in the file of this patent

UNITED STATES PATENTS

| | | |
|---|---|---|
| 2,467,853 | Poskitt | Apr. 19, 1949 |
| 2,595,729 | Swiss et al. | May 6, 1952 |
| 2,601,337 | Smith-Johansen | June 24, 1952 |
| 2,643,964 | Smith-Johansen | June 30, 1953 |
| 2,762,823 | Speier | Sept. 11, 1956 |
| 2,789,155 | Marshall | Apr. 16, 1957 |
| 2,832,754 | Jex et al. | Apr. 29, 1958 |

UNITED STATES PATENT OFFICE
CERTIFICATE OF CORRECTION

Patent No. 3,022,196                          February 20, 1962

David M. Jenkins et al.

It is hereby certified that error appears in the above numbered patent requiring correction and that the said Letters Patent should read as corrected below.

Column 1, line 55, for "fromula" read -- formula --; column 3, line 71, for "rubebr" read -- rubber --; column 5, line 39, for "silicon" read -- silicone --; column 6, line 33, for "falure" read -- failure --; line 51, for "stored" read -- stood --; column 8, line 48, for "aminopropyltriethoxys lane" read -- aminopropyltriethoxysilane --; line 55, for "o" read -- to --; column 9, line 38, for "d ssolving" read -- dissolving --; line 70, for "$R_2-Si(OR)_n$" read -- $R_1-Si(OR)_n$ --.

Signed and sealed this 17th day of July 1962.

(SEAL)
Attest:
ERNEST W. SWIDER
Attesting Officer

DAVID L. LADD
Commissioner of Patents